United States Patent
Makino et al.

(10) Patent No.: US 6,321,448 B1
(45) Date of Patent: Nov. 27, 2001

(54) METHOD OF MANUFACTURING TURBINE NOZZLE

(75) Inventors: Yoshinobu Makino, Machida; Kiyoshi Yamada, Akishima; Katsunori Minami, Fujisawa; Masahiro Yamada, Yokohama; Kazunori Hamada, Atsugi, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/621,557

(22) Filed: Jul. 21, 2000

(30) Foreign Application Priority Data

Jul. 23, 1999 (JP) .................................................. 11-209812

(51) Int. Cl.⁷ ..................................................... B23P 15/00
(52) U.S. Cl. ............................. 29/889.22; 29/558; 29/428
(58) Field of Search ........................... 29/889.22, 889.21, 29/889.2, 889, 557, 558, 428; 416/213 R, 186 R

(56) References Cited

U.S. PATENT DOCUMENTS 5,336,050 * 8/1994 Guida et al. ..................... 416/186 R
6,119,339 * 9/2000 Richter et al. ..................... 29/889.22

FOREIGN PATENT DOCUMENTS 4-356379  12/1992 (JP) .
7-11906   1/1995 (JP) .

* cited by examiner

Primary Examiner—I Cuda-Rosenbaum
(74) Attorney, Agent, or Firm—Oblon, Spivak, McClelland, Maier & Neustadt, P.C.

(57) ABSTRACT

In a method of manufacturing a turbine nozzle having a nozzle blade body, a flat plate is prepared. A first support plate for supporting an inner ring side of the turbine nozzle is blanked from the flat plate by using laser beam cutting. A second support plate for supporting an outer ring side of the turbine nozzle is blanked from the flat plate by using laser beam cutting. Each of the first and second support plates in bent so as to form each of the first and second support plates as a ring member. While controlling laser beam based on a program, by the laser beam, the ring-formed first and second support plates are drilled so as to form holes therethrough. At that time, each of the holes has a three-dimensional blade profile, and the three-dimensional blade profile corresponds to a three-dimensional profile of the nozzle blade body. After that, the nozzle blade body is inserted into the holes of the first and second support platen so as to weld the nozzle blade body thereto by using a laser beam. On the other hand, a diaphragm inner ring and a diaphragm outer ring are prepared and the first and second support plates are welded into the diaphragm inner and outer rings, respectively so as to manufacture the turbine nozzle.

18 Claims, 8 Drawing Sheets

METHOD OF MANUFACTURING TURBINE NOZZLE

BACKGROUND OF THE INVENTION

1. Field of the Invention

The present invention relates to a method of manufacturing a turbine nozzle.

2. Description of the Related Art

Conventionally. in a steam turbine used for a power generation plant, a turbine stage is constructed in a manner of combining a turbine nozzle (turbine stationary blade) and a turbine rotor blade.

The turbine nozzle of the turbine stage converts a steam energy into a velocity energy, and then, gives the velocity energy to a turbine rotor blade so as to rotate the turbine rotor blade, and thus, generates a rotating torque in a turbine shaft.

The latest turbine nozzle has a structure as shown in FIG. 13. More specifically, the turbine nozzle has a blade body nozzle blade body) 1 which is provided with a bottom portion (inner side portion) 2 to be supported by a support plate of inner ring side, a tip portion (head portion, outer side portion) 3 to be supported by a support plate of outer ring side and an intermediate portion 4 connecting the bottom portion 2 and the tip portion 3.

The intermediate portion 4 is provided with straight tilted portions TL which are formed to extend toward an inner concave side (abdominal side) 5 from respective bottom and head portions 2 and 3 of the blade body 1 with respect to a radius line RL passing through the center of the turbine shaft.

The intermediate portion 4 is provided with a curved portion CL which projects in a downstream side and connects the straight tilted portions TL. In this manner, a so-called compound lean type three-dimensional blade profile is realized. The turbine nozzle having the three-dimensional blade profile can reduce a secondary flow loss as compared with a turbine nozzle having a two-dimensional blade profile: therefore, it is possible to greatly improve a blade efficiency of the turbine nozzle.

In the case of inserting the above-described nozzle blade body 1, which is excellent in a flowing characteristic, between a support plate 6 of inner ring side of the nozzle and a support plate 7 of outer ring side thereof, there are some Problems.

First, in each of the support plates 6 and 7, a profile of each hole of each of the support plates 6 and 7 is two-dimensional; on the contrary, a blade profile of the nozzle blade body 4 is three-dimensional. For this reason, it is difficult to carry out the work for adjusting and positioning the nozzle blade body 4 to each hole of each support plate 6, 7 so as to insert that thereinto, so that, in the case where the nozzle blade body 4 is not positioned to each of the support plates 6 and 7 so as not to be inserted therein, it must be necessary to carry out a machining finish of each of inner surfaces of each of the holes of each of the support plates 6 and 7, whereby it takes much time to carry out the machining finish work.

That is, the positioning and adjusting works, the machining finish works and so on are repeatedly carried out when inserting the plurality of nozzle blade main bodies 1 into corresponding respective holes of the respective support plates 6 and 7, and therefore, there is a problem that a worker for the positioning and adjusting works and the machining finish works is forced to have a much labor.

In particular, labor and time have been spent for insertion, position and adjustment works in the vicinity of a leading edge 11 and a trailing edge 12 of the nozzle blade body 1 with respect to a hole of each of the support plates 6 and 7. Next, in order to shorten a time for inserting and positioning the nozzle blade body 1 between the support plates 6 and 7, there are many cases where an edge of each and face on a blade root portion 2 side and a blade chip portion 3 side of the nozzle blade body 1 is subjected to chamfering. In this case, each hole shape of the support plates 6 and 7 is different from a blade profile of the nozzle blade body 1 for this reason, a TIG welding time for filling up the chamfered portion of the nozzle blade body 1 becomes considerably long so that there is a problem that a bad influence is given to a quality guarantee of base material of the turbine nozzle, and a cost of manufacturing the turbine nozzle becomes high.

SUMMARY OF THE INVENTION

The present invention has been made in view of the aforesaid problems in the related art. It is, therefore, an object of the present invention to provide a method of manufacturing a turbine nozzle, which can shorten work times for adjusting and positioning the nozzle blade body and for machining it, making it possible to easily attach the nozzle blade body having a three-dimensional blade profile.

In order to achieve Such object, according to one aspect of the present invention, there is provided a method of manufacturing a turbine nozzle having a nozzle blade body, the method comprising the steps of: preparing a flat plate; blanking a first support plate that supports an inner ring side of the turbine nozzle from the flat plate by using laser beam cutting;, blanking a second support plate that supports an outer ring side of the turbine nozzle from the flat plate by using laser beam cutting; bending each of the first and second support plates so as to form each of the first and second support plates as a ring member; while controlling laser beam based on a program, drilling by the laser beam the ring-formed first and second support plates so as to form holes therethrough, each of the holes having a three-dimensional blade profile, the three-dimensional blade profile corresponding to a three-dimensional profile of the nozzle blade body; inserting the nozzle blade body into the holes of the first and second support plates so as to weld the nozzle blade body thereto by using a laser beam; preparing a diaphragm inner ring and a diaphragm outer ring; and welding the first and second support plates to the diaphragm inner and outer rings, respectively.

In preferred embodiment of this aspect, the nozzle blade body having the three-dimensional profile is provided at its both ends with straight tilted portions, and at intermediate portion with a curved portion.

In preferred embodiment of this aspect, the inserting step is adapted to insert both of end portions of the nozzle blade body to the holes of the first and second support plates so as to weld the nozzle blade body thereto by using a laser beam, respectively.

As described above the description, according to the present invention, in the method of manufacturing a turbine nozzle, laser beam cutting is carried out to the first and second support plates for supporting both end portions of the turbine nozzle body, that in, inner and outer ring sides of the turbine nozzle, respectively, so as to form holes each having a three-dimensional blade profile through each of the first and second support plates.

Therefore, it is possible to form holes each having a three-dimensional blade profile and having a high dimensional accuracy, thereby to greatly reduce work times for adjusting and positioning the nozzle blade body to the first and second support plates and for machining it.

BRIEF DESCRIPTION OF THE DRAWINGS

Other objects and aspects of the present invention will become apparent from the following description of an embodiment of the present invention with reference to the accompanying drawings in which.

DESCRIPTION OF THE PREFERRED EMBODIMENTS

A method of manufacturing a turbine nozzle according to an embodiment of the present invention is described hereinafter with reference to the accompanying drawings and reference numbers given to the drawings.

Figure 1:
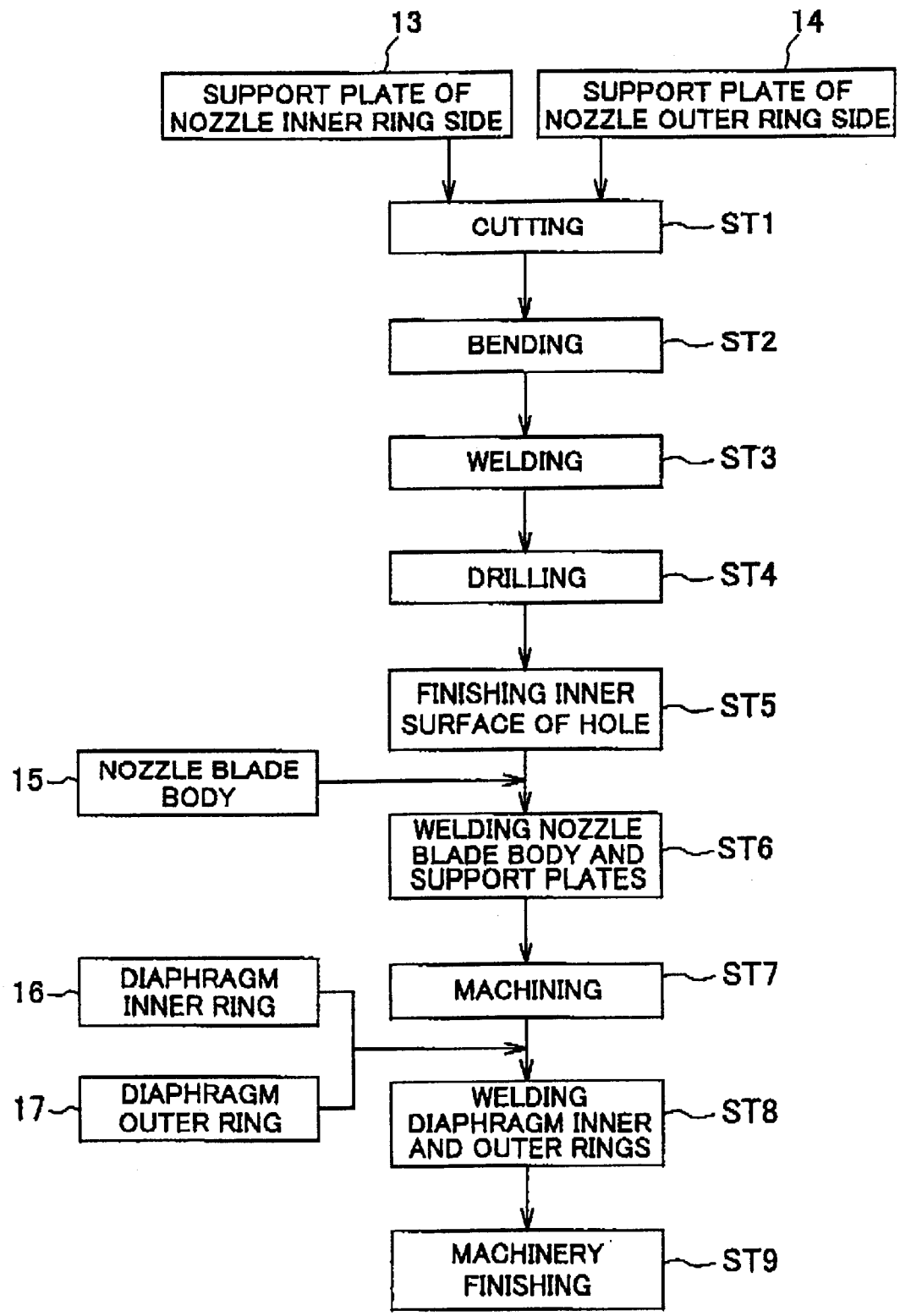
FIG. 1 is a process chart to explain processes of a method of manufacturing a turbine nozzle according to an embodiment of the present invention.

FIG. 1 is a process chart to explain a procedure of a method of manufacturing a turbine nozzle according to an embodiment of the present invention.

According to the method of manufacturing the turbine nozzle of this embodiment, in the case of manufacturing a support plate 13 of a nozzle inner ring side and a support plate 14 of a nozzle outer ring side, first of all, for example, an SUS 405 flat plate is cut into a plate having a design dimension by laser beam cutting of a laser beam machine, that is, the plate having the design dimension is blanked from the SUS 405 flat plate (step ST1), and thereafter, is bent so as to be formed into a ring shape by a roll bending machine (step ST2).

The ring-like shaped plates (support plates 13 and 14) of the nozzle inner and outer ring sides are individually formed as ring members by welding and connecting each end portion of them using any of a TIG welding machine, a MIG welding machine and a MAG/$CO_2$ welding machine (step ST3).

Figure 13:
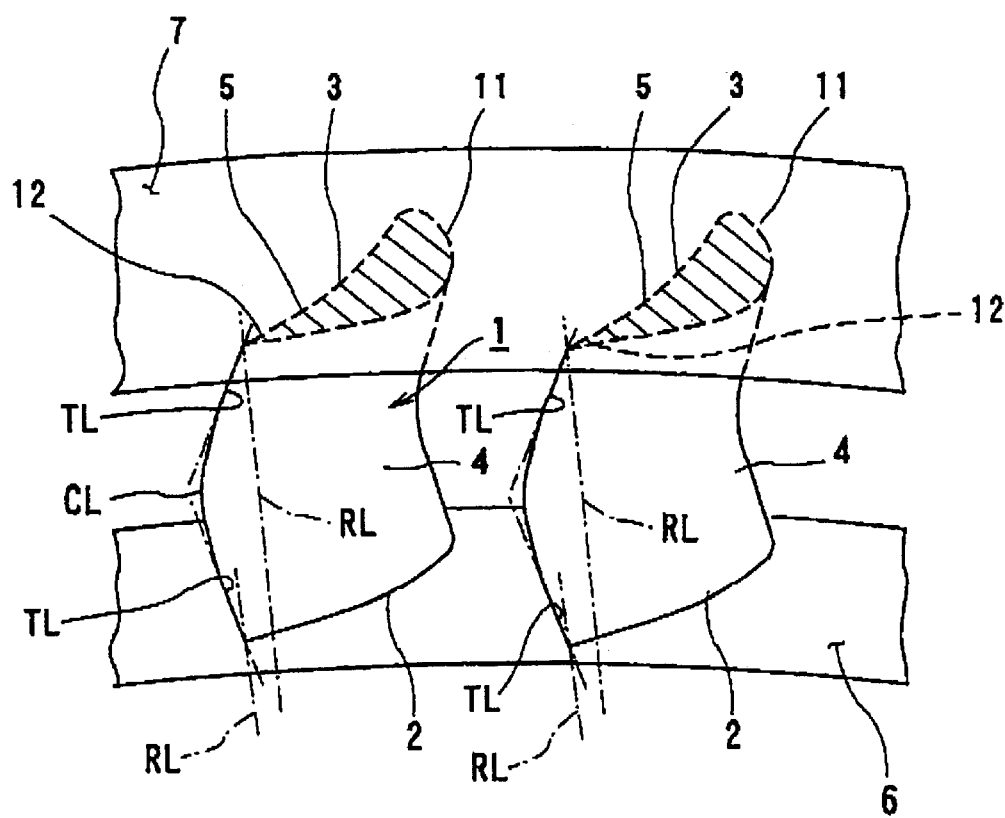
FIG. 13 is a schematic view illustrating a conventional turbine nozzle having a three-dimensional blade profile.

Subsequently, a drilling work is carried out along a circumferential direction of the ring members (the ring-formed support plates 13 and 14) so as to drill holes in the ring-formed support plates 13 and 14 by the laser beam machine controlled on the basis of a program (program instruction) programmed so as to shape each hole into a three-dimensional blade profile as shown in FIG. 13 (step ST4), and thereafter, an inner surface of each hole is subjected to machinery finishing (step ST5).

When the machinery finishing of the inner surfaces of the holes are completed, a nozzle blade body 15 formed into a three-dimensional blade profile is inserted and positioned to the aforesaid each hole of the ring-like shaped support plates 13 and 14, and then, laser beam welding is carried out by a laser beam machine using a filler wire (step ST6), and thereafter, thee welded portions of the nozzle blade body 15 and the support plates 13, 14 are subjected to machining (step ST7).

After the welded portions are subjected to machining, the support plates 13 and 14 of the nozzle inner and outer ring sides fixing and supporting the nozzle blade body 15 are incorporated between a diaphragm inner ring 16 and a diaphragm outer ring 17. Thereafter, beam welding is carried out by an electron beam machine so that the support plate 13 of the nozzle inner ring side is welded to the diaphragm inner ring 16 and the support plate 14 of the nozzle outer ring side is welded to the diaphragm outer ring 17 (step ST8), and then, its welded portions of the support plates 13, 14 and the rings 16, 17 are subjected to machinery finishing (step ST9).

Next, the following is a detailed description on a drilling work of support plates 13 and 14 of the nozzle inner and outer ring sides and a work of inserting and fixing the nozzle blade body 15 between the support plates 13 and 14 of the nozzle inner and outer ring sides.

Figure 2:
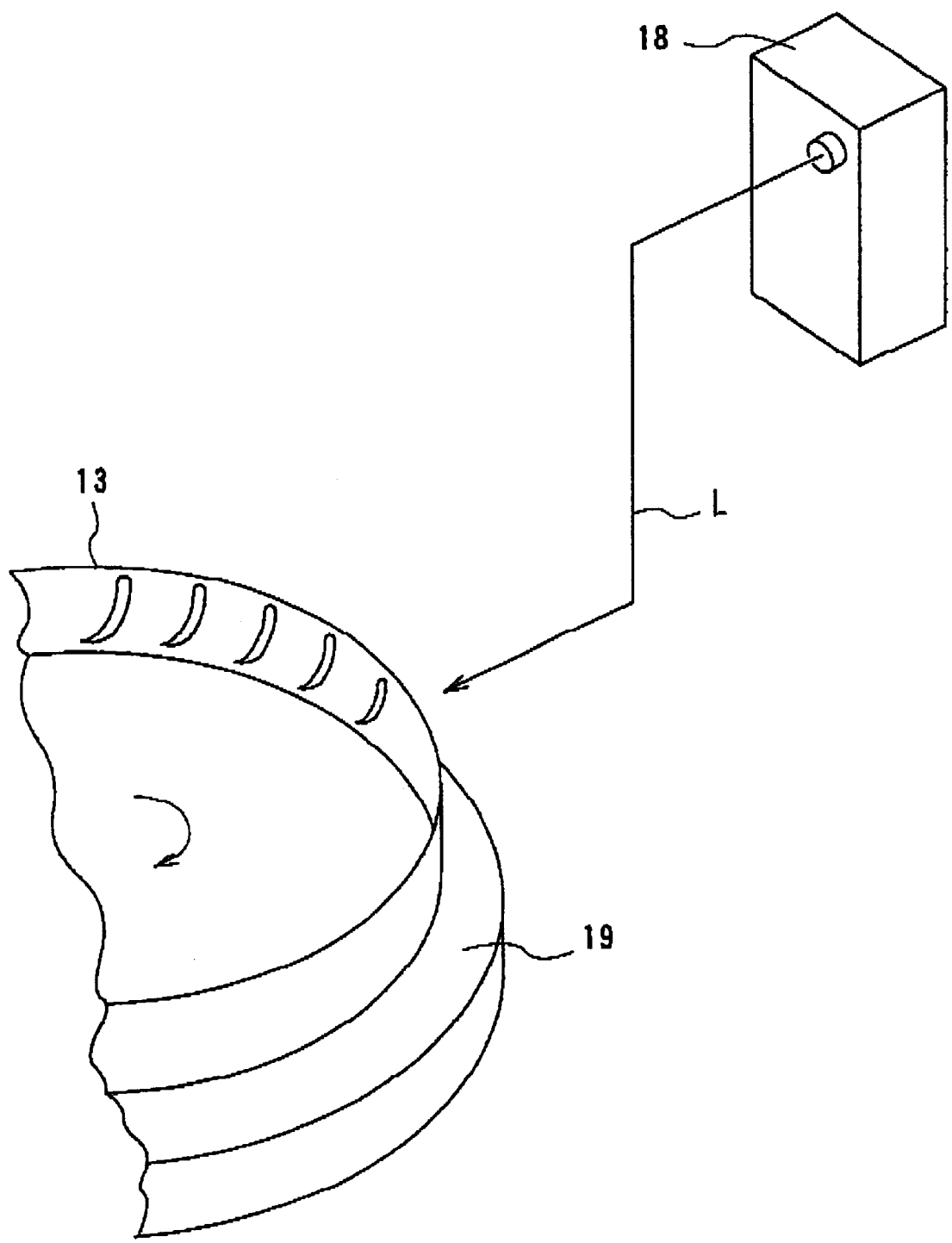
FIG. 2 is a Schematic view to explain a process of drilling by laser beam support plates of inner and outer ring sides of the turbine nozzle to form holes having three-dimensional blade profiles.

First, as shown in FIG. 2, the support plate 13 of the nozzle inner ring side or the support plate 14 of the nozzle outer ring side is placed on a turn table 19 while being adjusted and set on a position horizontal to a laser beam oscillator 18 of the laser beam machine.

Figure 11:
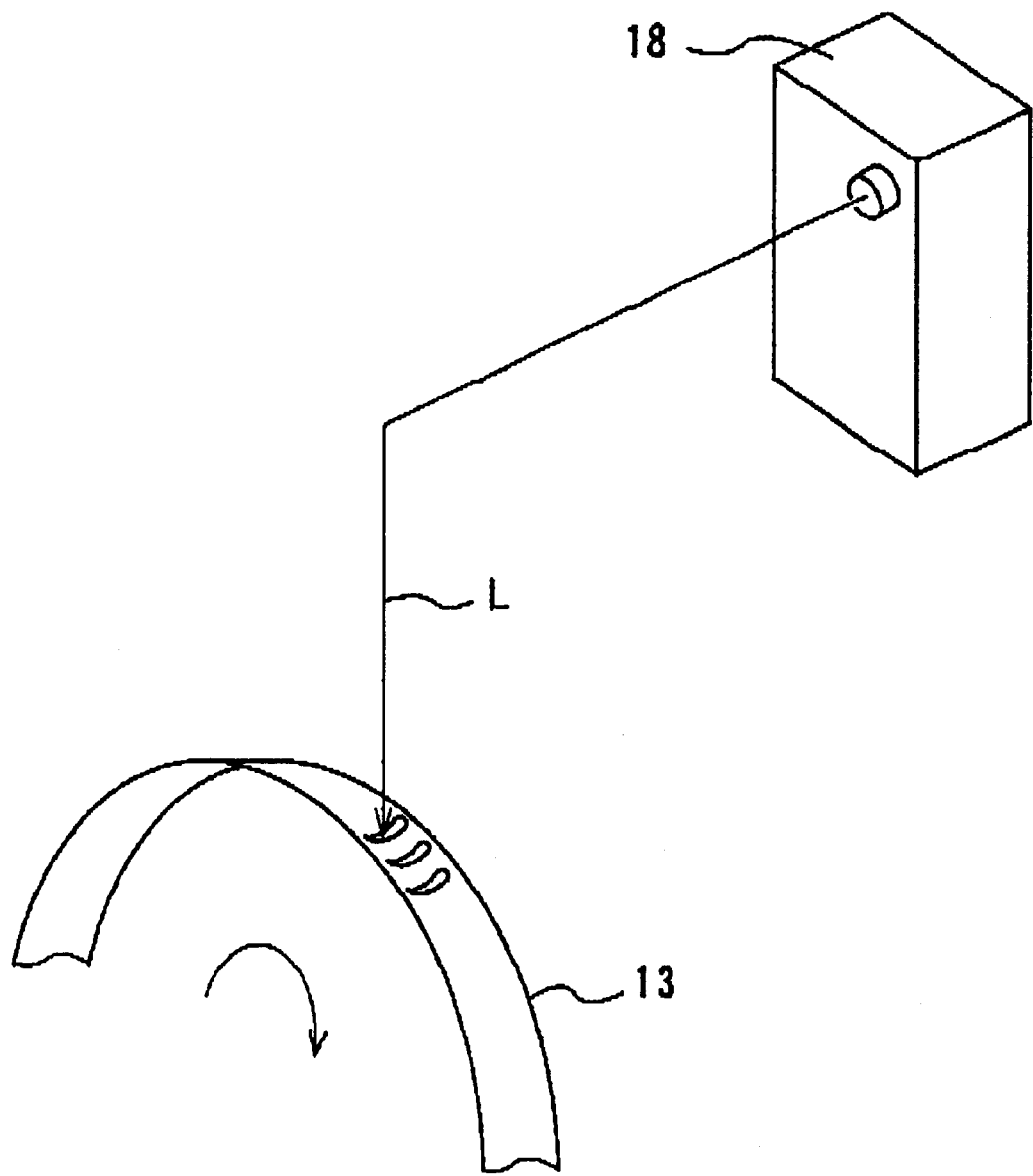
FIG. 11 is a schematic view to explain that the laser beam oscillator is arranged outside the support plate of the nozzle inner ring side in the case of drilling by laser beam the support plate of the nozzle inner ring side to form the hole having the three-dimensional blade profiler.

At this time, in the case where the laser beam oscillator 18 carries out drilling with respect to the support plate 13 or support plate 14 using a laser beam L, as shown in FIG. 11, it is preferable that the laser beam oscillator 18 is arranged outside (i.e., the diaphragm outer ring side); on the other hand, in the case where the laser beam oscillator 18 carries out drilling with respect to the support plate 14 of the nozzle outer ring side, it is preferable that the laser beam oscillator 18 is arranged inside (i.e., the diaphragm inner ring side).

The reason why the laser beam oscillator 18 is arranged as described above is as follows; more specifically, the support plate 13 of the nozzle inner ring side and the support plate 14 of the nozzle outer ring side have a thick plate thickness (18 mm to 19 mm); for this reason, a cutting width of a laser incident side and that of a laser emitting side are slightly shifted. Taking the above-described matter into consideration, the above-described arrangement of the laser beam oscillator 18 is made in order to maintain a high machining accuracy of each hole on an insertion start side or both ends of the nozzle blade body 15.

Figure 3:
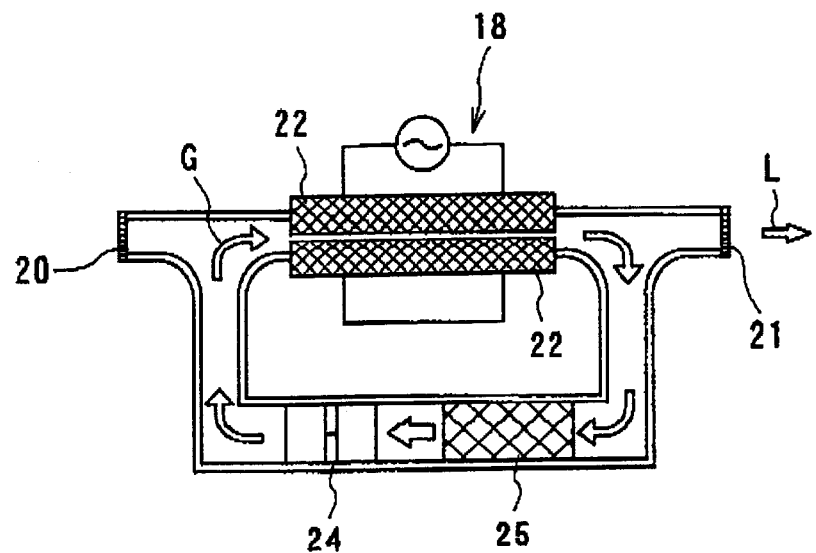
FIG. 3 is a schematic view illustrating a laser beam oscillator applied to the method of manufacturing a turbine nozzle according to the present invention.

Moreover, in the case of carrying out drilling with respect to the support plate 13 of the nozzle inner ring side, the laser beam oscillator 18 may be arranged inside (i.e., the diaphragm inner ring side). In addition, in the case of carrying out drilling with respect to the support plate 14 of nozzle outer ring side, the laser beam oscillator 18 may be arranged outside (i.e., the diaphragm outer ring side). The above-described arrangement is preferable taking economics of a drilling work by the laser beam into consideration. In this case, as shown in FIG. 3, the laser beam oscillator 18 includes a total reflecting mirror 20, a partial reflecting mirror 21, and electrodes 22 and 22, and a fan 24 and a heat exchanger 25 are provided in a circulating pipe 23 of the laser beam oscillator 18, and thus, a gas G is circulated so that the interior of the oscillator 18 is cooled.

Figure 4:
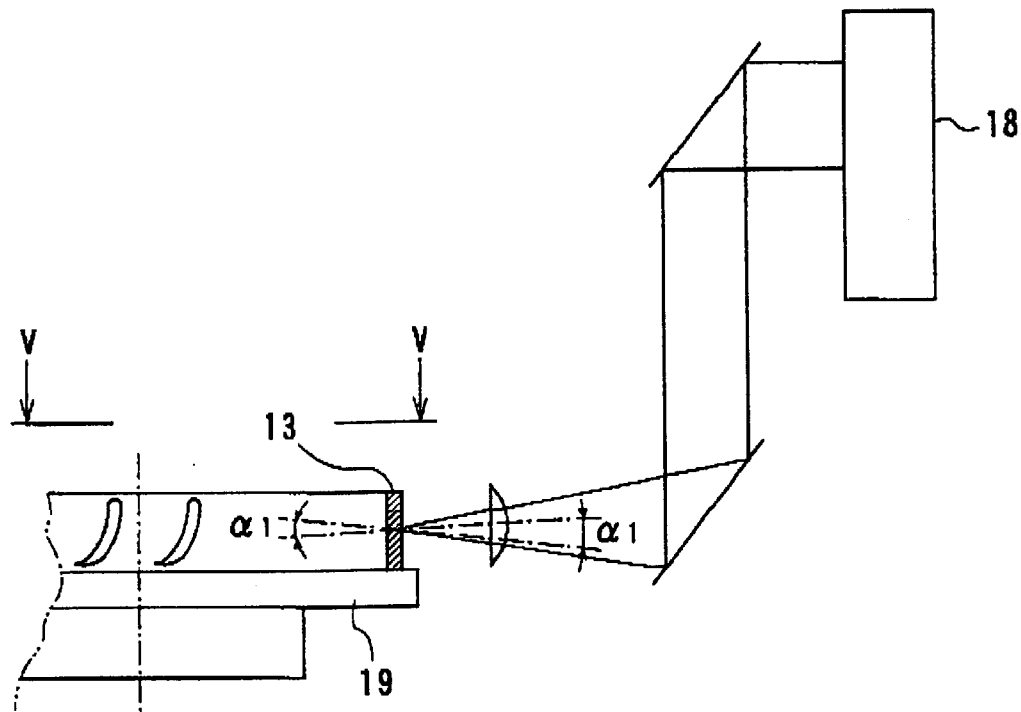
FIG. 4 is a schematic view to explain an incident angle of laser beam in the case of drilling by laser beam the support plate of the nozzle inner ring side to form the hole having the three-dimensional blade profile.

Meanwhile, in the case of carrying out drilling with respect to the support plate of the nozzle inner ring side, an incident angle of laser beam from the laser beam oscillator 18 is set in the following manner. More specifically, as shown in FIG. 4, in case of viewing from a vertical surface side of the support plate 13 of the nozzle inner ring side (side intersecting an inflow side of steam), assuming that an intersection angle made by a beam axis (an optical axis) and a normal line is set as $\alpha_1$, the intersection angle $\alpha_1$ is set within the following range.

0° (degrees)<$\alpha_1$<20° (degrees)

Figure 5:
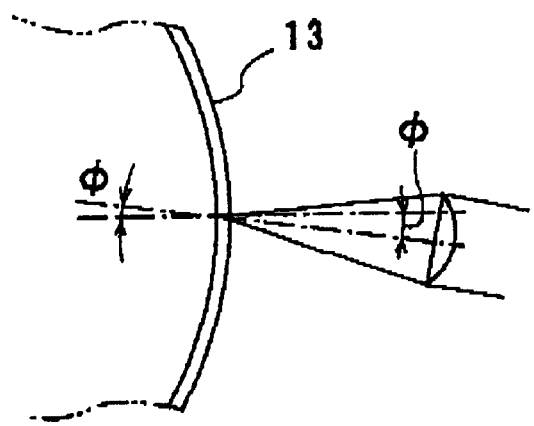
FIG. 5 is a top plan view when viewing from a V—V arrow direction of FIG. 4.

Moreover, in the case of carrying out drilling with respect to the support plate of the nozzle inner ring side, an incident angle of laser beam from the laser beam oscillator 18 is set in the following manner. More specifically, as shown in FIG. 5, in case of viewing from a flat surface side of the support plate 13 of the nozzle inner ring side (inflow side of steam), assuming that an intersection angle made by a beam axis and a normal line is set as $\phi$, the intersection angle $\phi$ is set within the following range.

0° (degrees)<$\phi$<20° (degrees)

These intersection angles $\alpha_1$ and $\phi$ are within preferable ranges for maintaining a hole dimension with a high accuracy in the case of carrying out drilling, and have been determined from the result of trial and error in the tests of drilling.

On the other hand, in the case of carrying out drilling with respect to the support plate 14 of the nozzle outer ring side, an incident angle of laser beam from the laser beam oscillator 18 is set in the following manner.

Figure 6:
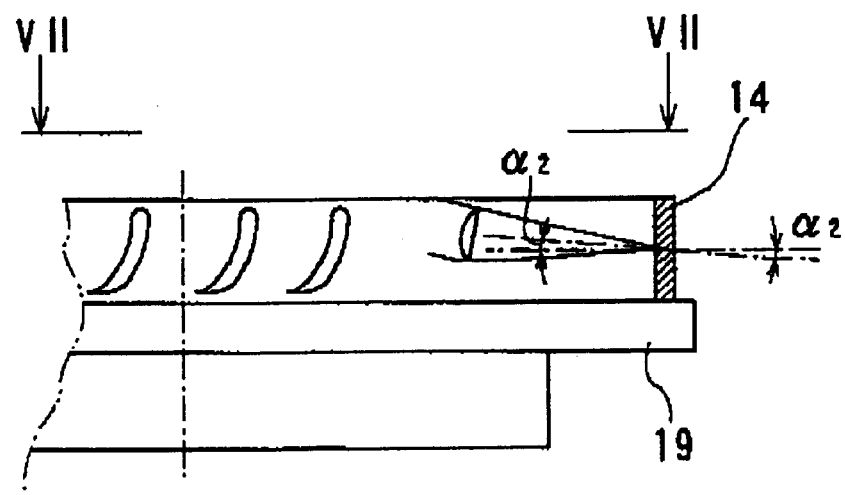
FIG. 6 is a schematic view to explain an incident angle of laser beam in the case of drilling by laser beam the support plate of nozzle outer ring side to form the hole having the three-dimensional blade profile.

More specifically, as shown in FIG. 6, in case of viewing from a vertical surface side of the support plate 14 of the nozzle outer ring side (side intersecting an inflow side of steam), assuming that an intersection angle made by a beam axis and a normal line is set as $\alpha_2$, the intersection angle $\alpha_2$ is set within the following range.

0° (degrees)<$\alpha_2$<15° (degrees)

Figure 7:
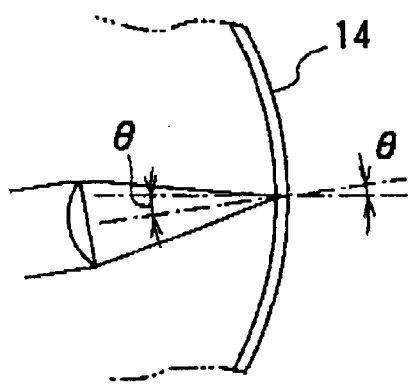
FIG. 7 is a top plan view when viewing from a VII—VII arrow direction of FIG. 6.

Moreover, in the case of carrying out drilling with respect to the support plate 14 of the nozzle outer ring side, an incident angle of laser beam from the laser beam oscillator 18 is set in the following manner. More specifically, as shown in FIG. 7, in case of viewing from a flat surface side of the support plate 14 of the nozzle outer ring side (inflow side of steam), assuming that an intersection angle made by a beam axis and a normal line to set as $\theta$, the intersection angle $\theta$ is set within the following range.

0° (degrees)<$\theta$<15° (degrees)

Likewise, these intersection angles $\alpha_2$ and $\theta$ are within preferable ranges for maintaining a hole dimension with a high accuracy set by repeating trial and error in the tests of drilling.

Next, the following is a description on a detailed procedure for carrying out drilling with respect to the support plates 13 and 14 of the nozzle inner ring sides.

In this embodiment, the drilling with respect to the support plates 13 and 14 is carried out by a laser beam three dimensionally moved by a movement mechanism on the basis of the program instructions programmed so as to shape a hole to be drilled into a three-dimensional blade profile.

That is, a laser beam from the laser beam oscillator 18 is irradiated to a direction orthogonal to each of the surfaces of each of the support plates 13 and 14 of each of the nozzle inner and outer ring sides.

Figure 8:
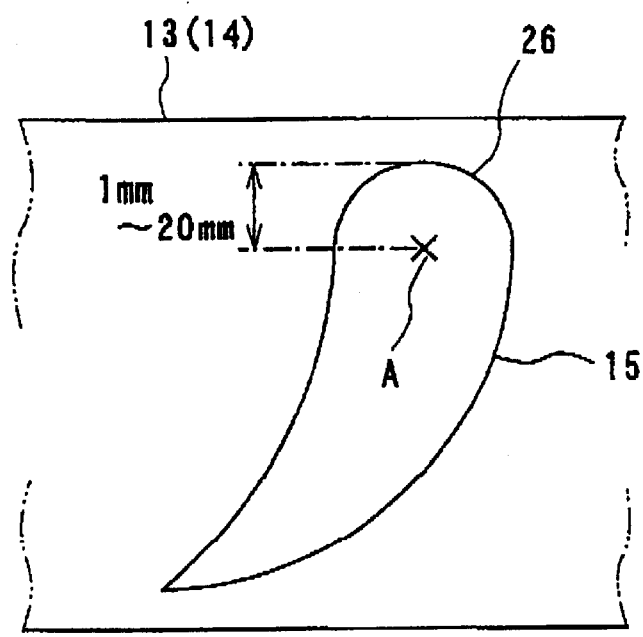
FIG. 8 is a schematic view to explain a process of piercing by laser beam the support plates of nozzle inner and outer ring sides to form the holes having the three-dimensional blade profiles.
Figure 9:
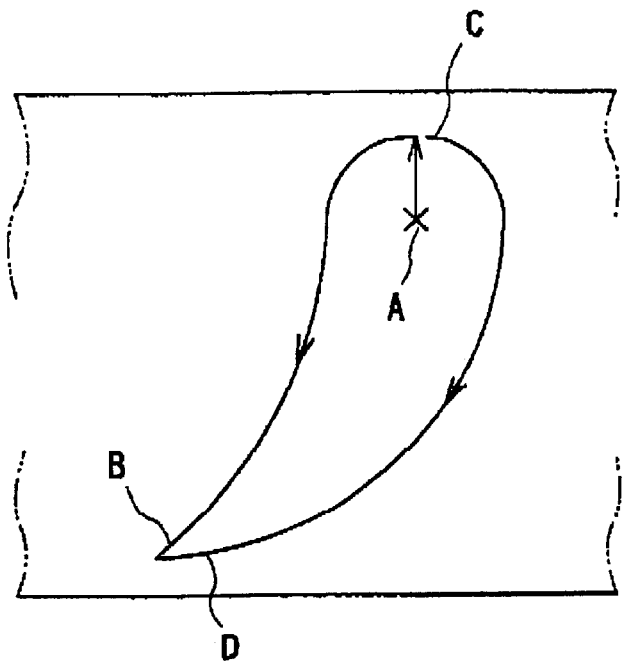
FIG. 9 is a schematic view for explaining a drilling procedure in the case of drilling by laser beam the support plates of the nozzle inner and outer ring sides to form the holes having the three-dimensional blade profiles.

As shown in FIG. 8 and FIG. 9, piercing (prepared hole machining) is carried out so as to pierce a prepared hole in a position A within a range from 1 to 20 mm from the leading edge 26 of the nozzle blade body 15 toward a downstream side, and then, cutting is carried out up to a position B. More specifically, the laser beam from the laser beam oscillator 18 is moved from a position irradiated to the work peace (support plate 13 or 14) toward a downstream aide shown by an arrow; namely, the laser beam is moved to a so-called vertical downward direction, and then, drilling is carried out.

Figure 10:
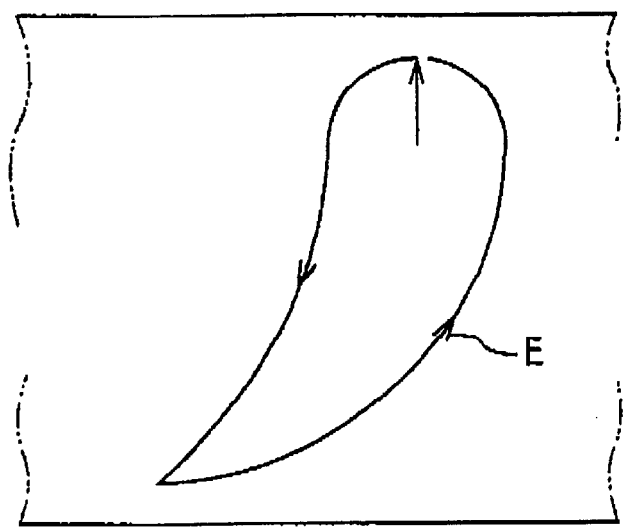
FIG. 10 is a schematic view for explaining another drilling procedure different from the drilling procedure shown in FIG. 9.

Next, the laser beam is again moved to a position C, and then, is moved to a direction shown by an arrow, that is, a vertical downward direction, and thereafter, drilling is completed at a position D. In this case, as shown in FIG. 10, drilling may be carried out in the manner of a single stroke of the brush. However, in the case where the laser beam is moved from a position irradiated to the workpiece (support plate 13 or 14) toward an upstream side; namely the laser beam is moved to a so-called vertical upward direction (shown by an arrow E), a molten metal fills up a cut groove of the support plate 13 or 14.

For this reason, there is the need of preventing the molten metal from again solidifying by a gravitation effect; therefore, it is preferable that the laser beam is always moved to the vertical downward direction as shown in FIG. 9.

In the case of carrying out drilling with respect to each of the support plates 13 and 14 of the nozzle Inner and Outer ring sides, drilling is carried out under the following technical matters, First, each of the support plates 13 and 14 is made of an SUS405 material, and has a plate thickness of 5 to 20 mm, and further, is subjected to drilling using a $CO_2$ laser beam machine. In this case, the condition of the $CO_2$ laser beam machine is in the following specifications, as shown in the table 1 hereinafter

TABLE 1

| | |
|---|---|
| laser peak power | :3~9 kW |
| pulse condition | frequency of 15~1000 Hz, duty ratio of 10~50% |
| cutting speed | 30~500 mm/min (500 mm/min or less) |
| cutting gas | oxygen, pressure of 4 kgf/cm$^2$ (0.392266 N/mm$^2$) and over |

Moreover, a focal length of a condenser lens ranges 5 inches (127 mm) to 15 inches (381 mm). In this embodiment, the $CO_2$ laser beam machine is used for carrying out drilling with respect to each of the support plate 13 of the nozzle inner ring side and the support plate 14 of the nozzle outer ring side. In this case, a YAG laser may be used.

In addition, in this embodiment, each of the support plates 13 and 14 of the nozzle inner and outer ring sides is made of an SUS 405 material. In the case of using a low Cr steel; more specifically, in the case of carrying out drilling with respect to 2.5% Cr-1% Mo steel, the following specifications are employed as shown in the table 2 hereinafter.

TABLE 2

| laser peak power | :3~9 kW |
|---|---|
| pulse condition | frequency of 20~1000 Hz, duty ratio of 10~100% |
| cutting speed | 400~3000 mm/min (3000 mm/min or less) |
| cutting gas | oxygen, pressure of 3 kgf/cm$^2$ (0.2941995 N/mm$^2$) or less |
| focal length of condenser lens | 5 inches~15 inches |

As seen from the above-described specifications, a drilling speed becomes twice or more as compared with a high Cr steel (SUS 405); therefore, a drilling work of the low Cr steel can be performed at a high speed.

In this embodiment, a gas used for laser beam drilling is oxygen. In this case, a nitrogen gas may be used.

Laser beam cutting using a nitrogen gas is effective in welding after cutting because a cutting surface is not oxidized. In the laser beam cutting using a nitrogen gas, a high gas pressure is required, in the high Cr steel (SUS 405), drilling can be performed at a high speed.

In the case of carrying out drilling with respect to the high Cr steel using a nitrogen gas, the following specifications are employed as shown in the table 3.

TABLE 3

| laser peak power | :3~9 kW |
|---|---|
| pulse condition | frequency of 20~1000 Hz, duty ratio of 10~80% |
| cutting speed | 500~3000 mm/min (3000 mm/min or less) |
| cutttng gas | nitrogen, pressure of 7 kgf/cm$^2$ (0.6864655 N/mm$^2$) and over |
| focal length of condenser lens | 5 inches~15 inches |

When a drilling work is completed with respect to each of the support plates 13 and 14 of the nozzle inner and outer ring sides, in this embodiment, holes each having a three dimensional profile are drilled to be formed on the support plates 13 and 14 so that the nozzle blade body 15 having a three-dimensional blade profile is inserted into each of the holes of the support plates 13 and 14. Then, the nozzle blade body 15 is temporarily fixed thereto, and thereafter, final build-up welding by laser bean through an optical and convergent system OC is carried out.

Figure 12:
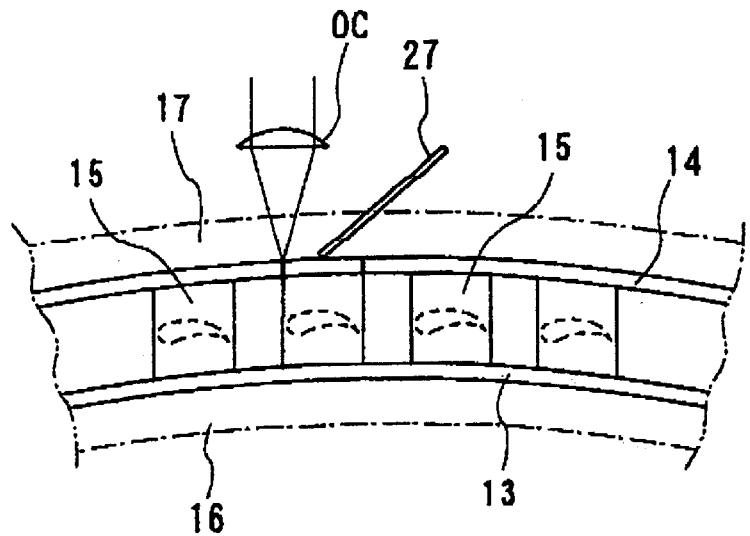
FIG. 12 is a schematic view to explain a final weld for welding a nozzle blade body to the wear blades of the nozzle inner and outer ring sides.

In the final build-up welding, as shown in FIG. 12, in the case of welding and fixing the nozzle blade body 15 to each of the support plates 13 and 14 of the nozzle inner and outer ring sides, a filler wire 27 is used as a filler material (metal).

An inconel-based alloy (containing Cr of 18 to 22%) or a SUS 16-based stainless steel is used as the filler wire 27 in the case where these support plates 13 and 14 are made of an SUS 405 material, and the nozzle blade body 15 is made of a 13 Cr—Nb material. The inconel-based alloy or SUS 316-based filler wire 27 is convenient because it has no solidification crack after being welded, and has no need of heat treatment.

Incidentally, an SUS 410-based stainless steel filler wire 27 is used depending upon the combination of the material quality of the support plates 13 and 14 and the material quality of the nozzle blade body 15. In this case, in order to prevent a weld crack of weld portions of the support plates 13, 14 and the nozzle blade body 15, for example, a heat treatment is carried out in a manner of heating the filler wire 27 at a temperature of 300 to 500° C. for 30 minutes to one hour, and thereafter, cooling it.

A working condition of the $CO_2$ laser is in the following specifications, as shown in the table 4 hereinafter.

TABLE 4

| laser peak power | :3~15 kW |
|---|---|
| cutting speed | 100~2000 mm/min |
| shield gas | He, $N_2$, Ar, amount of using one of them is 20~200 l/min |
| amount of supplying filler material | 500 4000 mm/min |
| diameter of filler material | φ 0.6~1.6 mm |
| focal length of condenser lens | 5 inches~15 inches, as optical and convergent system, lens made of ZnSe or parabolic mirror may be used |

When a final build-up welding is completed with respect to each of the support plates 13 and 14 of the nozzle inner and outer ring sides of the nozzle blade body 15, finally, in this embodiment, the support plate 13 of the nozzle inner ring side and the support plate 14 of the nozzle outer ring side are welded to the diaphragm inner ring 16 and the diaphragm outer ring 17 by electron beam welding or MAG welding, respectively, and thereafter, are subjected to machinery finishing, and thus, a turbine nozzle is manufactured to be completed.

As described above, in this embodiment, the flat plate is cut into each of the support plates 13 and 14 of the nozzle inner and outer ring sides by using a laser beam, and then, drilling is carried out with respect to each of the support plates 13 and 14 by using a laser beam so that holes each having a three-dimensional blade profile are formed through the support plates 13 and 14. Thereafter, the nozzle blade body 15 is temporarily welded in a state of being inserted and positioned in the three-dimensional blade profile holes of the support plates 13 and 14, and further, laser build-up welding is carried out for final welding of the nozzle blade body 15 and each of the support plates 13 and 14. Therefore, it is possible to reduce works and work times for adjusting and positioning the nozzle blade body and for machining it, making it possible to weld the nozzle blade body 15 having a high quality to each of the support plates 13 and 14.

While there has been described what is at present considered to be the preferred embodiments and modifications of the present invention. It will be understood that various modifications which are not described yet may be made therein, and it is intended to cover in the appended claims all such modifications as fall within the true spirit and scope of the invention.

The entire contents of Japanese Patent Application H11-209812, filed on Jul. 23, 1999, are incorporated herein by reference.

What is claimed:

1. A method of manufacturing a turbine nozzle having a nozzle blade body, the method comprising the steps of:
   preparing a flat plate;
   blanking a first support plate that supports an inner ring side of the turbine nozzle from the flat plate by using laser beam cutting;

blanking a second support plate that supports an outer ring side of the turbine nozzle from the flat plate by using laser beam cutting;

bending each of the first and second support plates so as to form each of the first and second support plates as a ring member;

while controlling laser beam based on a program, drilling by the laser beam the ring-formed first and second support plates so as to form holes therethrough, each of said holes having a three-dimensional blade profiles said three-dimensional blade profile correspondig to a three-dimensional profile of the nozzle blade body;

inserting the nozzle blade body into the holes of the first and second support plates so as to weld the nozzle blade body thereto by using a laser beam;

preparing a diaphragm inner ring and a diaphragm outer ring; and welding the first and second support plates to the diaphragm inner and outer rings, respectively.

2. A method of manufacturing a turbine nozzle according to claim 1, wherein said nozzle blade body having the three-dimensional profile is provided at both ends thereof with straight tilted portions, and at intermediate portion with a curved portion.

3. A method of manufacturing a turbine nozzle according to claim 1, wherein said inserting step is adapted to insert both of end portions of the nozzle blade body to the holes of the first and second support plates so as to weld the nozzle blade body thereto by using a laser beam, respectively.

4. A method of manufacturing a turbine nozzle according to claim 1, wherein said drilling step comprises, when drilling by the laser beam the first support plate to form the hole having the three-dimensional blade profile, the step of irradiating the laser beam to the first support plate from an outside thereof.

5. A method of manufacturing a turbine nozzle according to claim 1, wherein said drilling step comprises, when drilling by the laser beam the first support plate to form the hole having the three-dimensional blade profile, the step of irradiating the laser beam to the first support plate from an inside thereof.

6. A method of manufacturing a turbine nozzle according to claim 1, wherein said drilling step comprises, when drilling by the laser beam the second support plate to form the hole having the three-dimensional blade profile, the step of irradiating the laser beam to the second support plate from an inside thereof.

7. A method of manufacturing a turbine nozzle according to claim 1, wherein said drilling step comprises, when drilling by the laser beam the second support plate to form the hole having the three-dimensional blade profile, the step of irradiating the laser beam to the second support plate from an outside thereof.

8. A method of manufacturing a turbine nozzle according to claim 1, wherein the drilling step comprises, when drilling by the laser beam the first support plate to form the hole having the three-dimensional blade profile, the step or irradiating the laser beam to the first support plate so that a beam axis of the irradiated laser beam is set within a range from 0 degrees to 20 degrees with respect to a normal line when viewing from a vertical side surface of the first support plate.

9. A method of manufacturing a turbine nozzle according to claim 1, wherein the drilling step comprises, when drilling by the laser beam the first support plate to form the hole having the three-dimensional blade profile, the step of irradiating the laser beam to the first support plate so that a beam axis of the laser beam is set within a range from 0 degrees to 20 degrees with respect to a normal line when viewing from a plane surface of the first support plate.

10. A method of manufacturing a turbine nozzle according to claim 1, wherein the drilling step comprises, when drilling by the laser beam the second support plate to form the hole having the three-dimensional blade profile, the step of irradiating the laser beam to the second support plate so that a beam axis of the laser beam is set within a range from 0 degrees to 15 degrees with respect to a normal line when viewing from a vertical side surface of the second support plate.

11. A method of manufacturing a turbine nozzle according to claim 1 wherein the drilling step comprises, when drilling by the laser beam the second support plate to form the hole having the three-dimensional blade profile, the step of irradiating the laser beam to the second support plate so that a beam axis of the laser beam is set within a range from 0 degrees to 15 degrees with respect to a normal line when viewing from a plane surface of the second support plate.

12. A method of manufacturing a turbine nozzle according to claim 1, wherein each of the first and second support plates is made or a nigh Cr steel material, and wherein the drilling step is adapted to drill the first and second support plates by the laser beam under conditions that oxygen is used as a machining gas, a gas pressure of oxygen is 4 kgf/cm$^2$ and over and a drilling speed is 500 mm/min or less.

13. A method of manufacturing a turbine nozzle according to claim 1, wherein each of the first and second support plates is made of a high Cr steel material, and wherein the drilling step is adapted to drill the first and second support plates by the laser beam under conditions that oxygen is used as a machining gas, a gas pressure of oxygen is 3 kgf/cm$^2$ or less and a drilling speed is 3000 mm/min or less.

14. A method of manufacturing a turbine nozzle according to claim 1, wherein each of the first and second support plates is made of a high Cr steal material, and wherein the drilling step is adapted to drill the first and second support plates by the laser beam under conditions that nitrogen is used as a machining gas, a gas pressure of nitrogen is 7 kgf/cm$^2$ and over and a drilling speed is 3000 mm/min or less.

15. A method of manufacturing a turbine nozzle according to claim 1, wherein the drilling step comprises, when drilling by the laser beam the first and second support plates to form the holes each having the three-dimensional blade profile, the step of piercing a prepared hole in a position on each of the holes within a range from 1 mm to 20 mm from a leading edge of each of the holes having the three-dimensional blade profile.

16. A method of manufacturing a turbine nozzle according to claim 1, wherein the drilling stop comprises, when drilling by the laser beam the first and second support plates to form the holes each having the three-dimensional blade profile, the step of irradiating the laser beam toward a vertical downward direction with respect to the first and second support plates.

17. A method of manufacturing a turbine nozzle according to claim 1, wherein said welding step is adapted to, when welding the first and second support plates to the nozzle blade body, supply a filler material so as to melt the filler wire thereby welding and fixing each of the first and second plates to the nozzle blade body.

18. A method of manufacturing a turbine nozzle according to claim 1, wherein each of the first and second support plates is made of an SUS 405 stainless steel and the nozzle blade body is made of a 13 Cr—Nb material, and wherein said welding step is adapted to, when welding the first and second support plates to the nozzle blade body, select one of a filler material made of an inconel-based alloy and a filler material made of SUS 316-based stainless steel so at to melt the selected filler wire thereby welding and fixing each of the first and second plates to the nozzle blade body.

* * * * *